United States Patent [19]

Lakshmanan

[11] 3,919,160

[45] Nov. 11, 1975

[54] ADHESIVE COMPOSITION

[75] Inventor: Pallavoor R. Lakshmanan, Allison Park, Pa.

[73] Assignee: Gulf Research & Development Company, Pittsburgh, Pa.

[22] Filed: May 20, 1974

[21] Appl. No.: 471,467

[52] U.S. Cl.... 260/32.8 A; 260/31.2 R; 260/33.6 A
[51] Int. Cl.² .......................................... C08K 5/07
[58] Field of Search......... 260/33.6 A, 32.8 A, 892, 260/894

[56] References Cited
UNITED STATES PATENTS

| | | | |
|---|---|---|---|
| 3,519,585 | 7/1970 | Miller | 260/894 X |
| 3,686,365 | 8/1972 | Sequeira | 260/33.6 A X |

Primary Examiner—Lewis T. Jacobs

[57] ABSTRACT

An adhesive composition consisting essentially of a styrene-butadiene block copolymer, a styrene-isoprene block copolymer, an isoprene-piperylene copolymer and a solvent.

7 Claims, No Drawings

ADHESIVE COMPOSITION

This invention relates to an adhesive composition possessing a relatively high tack time (at least about 5 minutes, preferably from about 10 to about 120 minutes) and an excellent dead load hot strength (1000-gram dead load of at least about 200°F, preferably about 220° to about 300° F.), consisting essentially of a styrene-butadiene block copolymer, a styrene-isoprene block copolymer, an isoprene-piperylene copolymer and a solvent.

The styrene-butadiene block copolymer present in the adhesive composition of the present invention has the following general configuration:

$$A - B - A,$$

wherein each terminal A is a styrene polymer block with a glass transition temperature above about room temperature (26° C.) and which is relatively incompatible with elastomeric segment B, defined hereinafter, with the average molecular weight of each A being from about 5,000 to about 125,000, preferably from about 15,000 to about 100,000. B is a butadiene polymer with a glass transition temperature below about room temperature (26° C.) with the average molecular weight of B being from about 15,000 to about 250,000, preferably from about 25,000 to about 150,000. The difference in glass transition temperature between an end block A and a center block B is preferably greater than about 100° C. In the block copolymer used herein the total of the terminal blocks A will amount to about 20 to about 80 weight per cent, preferably from about 23 to about 50 weight per cent, based on the total weight of the block copolymer.

The styrene-isoprene block copolymer present in the adhesive composition of the present invention has the following general configuration:

$$A_1 - B_1 - A_1,$$

wherein each terminal $A_1$ is a styrene polymer block with a glass transition temperature above about room temperature (26° C.) and which is relatively incompatible with the elastomeric segment $B_1$, defined hereinafter, with the average molecular weight of each A, being from about 2,000 to about 100,000, preferably from about 5,000 to about 50,000. $B_1$ is an isoprene polymer with a glass transition temperature below about room temperature (26° C.), with the average molecular weight of $B_1$ being from about 25,000 to about 1,000,000, preferably from about 50,000 to about 500,000. The difference in glass transition temperature between an end block A, and a center block B, is preferably greater than about 100° C. In the block copolymer used herein the total of the terminal blocks $A_1$ will amount to about eight to about 50 weight per cent, preferably about 10 to about 40 weight per cent, based on the total weight of the block copolymer.

The third component of the adhesive herein is an isoprene-piperylene copolymer. These copolymers can be obtained, for example, by polymerization of a $C_5$ stream of aliphatic petroleum derivatives containing a major proportion of piperylene and isoprene monomers, for example, as in U.S. Pat. No. 3,290,275. Although the stream being polymerized can contain small amounts of higher carbon number monomers, the character of the stream is essentially that attributable to its $C_5$ components. The stream can contain, for example, about 25 weight per cent each of piperylene and isoprene, with the remainder including, for example, tertiary amylenes, tertiary monomers, such as styrene or beta pinene, etc. but the copolymer will be made up mainly of piperylene and isoprene. In general, the melting points of these copolymers are in the range of about 70° to about 130° C.

The last component required herein is a solvent or mixtures thereof boiling between about 50° to about 145° C., preferably between about 55° to about 120° C., at atmospheric pressure. Those boiling below the defined range will be released too rapidly from the adhesive composition, causing handling problems, such as insufficient working time, while those boiling above the defined range may require a longer time than normal time for the adhesive to set. Solvents which can be used are aromatics having from six to eight carbon atoms, such as toluene, the xylenes, etc.; aliphatics having from six to eight carbon atoms, such as normal hexane, normal octane, etc., ketones having from two to four carbon atoms, such as methyl ethyl ketone, acetone, etc.; esters having from two to four carbon atoms, such as ethyl acetate, butyl acetate, etc.; etc.

The adhesive composition can be prepared in any conventional manner. For example, the ingredients can be added to the solvent in any order, after which mixing can take place until a substantially homogeneous mixture is obtained. Such mixing can be carried out at room temperature and room pressure over a period of about 1 to about 4 hours, or, alternatively, the ingredients can be mixed and set aside for about 24 hours during which dissolution of the various adhesive components takes place.

The adhesive composition herein will consist essentially of the following components within the following ranges, assuming the presence of 100 parts by weight of the styrene-butadiene component in the final composition:

| Component | Weight Per Cent Broad Range | Weight Per Cent Preferred Range |
|---|---|---|
| Styrene-Isoprene Block Copolymer | 5–300 | 20–100 |
| Isoprene-Piperylene Copolymer | 5–300 | 20–100 |
| Solvent | 50–4000 | 200–800 |

If desired, a coumarone-indene resin can be added to the adhesive composition defined above to further improve the dead load hot strength thereof, although the tack time of the adhesive composition, as a result of such addition, will be reduced thereby. If a coumarone-indene resin is added to the adhesive composition, the amount added must be within a range of about 5 to about 200 weight per cent, preferably about 75 to about 150 weight per cent, based on the isoprene-piperylene copolymer. In addition, an antioxidant, such as 1,3,5-trimethyl-2,4,6-(3,5-ditertiarybutyl-4-hydroxybenzyl)benzene, can be incorporated in the adhesive composition in an amount of about 0.1 to about 5 weight per cent, based on the weight of the final composition.

The new adhesive composition of this invention is particularly useful in bonding wood, plastic, metal, a cellulosic material, such as paper, glass, etc., to itself or to another member of such group.

The improved adhesive composition of this invention can be further understood by reference to the following. Compositions were prepared using combinations of a styrene-butadiene block copolymer, a styrene-isoprene block copolymer, an isoprene-piperylene copolymer, a coumarone-indene resin, the antioxidants 1,3,5-tri-methyl-2,4,6-(3,5-ditertiary-4-hydroxybenzyl)benzene and dilauryl thio dipropionate and a solvent (containing toluene, hexane and acetone in a weight ratio of 1:1:1). Whichever components were used in preparing the compositions were added to the solvent and the resultant composition was mixed for about 1 to about 4 hours at atmospheric pressure and atmospheric temperature until a homogeneouos composition was obtained. The compositions were then tested for tack time and for their dead load hot strength as follows:

Tack Time:

Wet films of the test adhesives were applied to both glass and 50-pound Kraft paper with a 10 mil drawndown bar. At 2-minute intervals ½-inch strips of the coated paper were cut and laid film side down on the coated glass. These strips were applied using moderate finger-tip pressure and were stripped off immediately after they were applied. The time which had elapsed between the initial application of the wet adhesive to the two substrates and the final drying of the adhesive to the point where the coated paper no longer adhered to the coated paper was recorded as tack time.

Dead Load Hot Strength:

This test is designed to measure the resistance of an adhesive to flow under a sustained load (creep) at an elevated temperature. A canvas-to-steel shear specimen having a 1 square inch bonded area was prepared for each test adhesive. In preparing the specimen two coats of adhesive were applied to the canvas and one coat was applied to the steel surface. The coated surfaces were assembled while still tacky and pressed together with a 10-pound roller. The specimens were aged for 1 week at room temperature before testing. The specimen was tested by suspending it in an oven at 130° F. at a constant shear load of 1000 grams. The test assembly consisted of a series of clamps attached to the top of the oven; the steel portions of the specimen was secured by these clamps, and the 1000-gram load was then hooked into slots which were cut into the canvas portions of the specimen. The specimen was clamped in a vertical position so as to maintain a shear load on the adhesive joints. The oven temperature was increased 10° F. every 15 minutes until the bond failed or until a temperature of 300° F. was reached. The temperature at failure was recorded as the dead load hot strength.

The data obtained are tabulated below in Tables I and II.

Table I

| Run Number | I | II | III | IV |
|---|---|---|---|---|
| Kraton 1101, Grams | 100 | 100 | 100 | 100 |
| Kraton 1107, Grams | 20 | 20 | None | 20 |
| Cumar LX-509, Grams | None | 37.5 | 37.5 | 37.5 |
| Sta-tac 100, Grams | 37.5 | None | 37.5 | 37.5 |
| 1,3,5-tri-methyl-2,4,6 (3,5-ditertiary-4-hydroxybenzyl)benzene, grams | 0.5 | 0.5 | 0.5 | 0.5 |
| Dilauryl Thio Dipropionate, Grams | 0.5 | 0.5 | 0.5 | 0.5 |
| Solvent, Grams | 475 | 475 | 528 | 588 |

Table I-continued

| Run Number | I | II | III | IV |
|---|---|---|---|---|
| Results |  |  |  |  |
| Tack Time, Minutes | >100 | 3 | 3 | 80 |
| Dead Load Hot Strength, °F. | 240 | 290 | 260 | 220 |

Table II

| Run Number | V | VI | VII |
|---|---|---|---|
| Kraton 1101, Grams | 100 | 100 | 100 |
| Kraton 1107, Grams | 20 | 20 | 20 |
| Cumar LX-509, Grams | 46.87 | 56.25 | 75.0 |
| Sta-tac 100, Grams | 37.5 | 37.5 | 37.5 |
| 1,3,5-trimethyl-2,4,6-(3,5-di-tertiary-4-hydroxy-benzyl)benzene, grams | 0.5 | 0.5 | 0.5 |
| Dilauryl Thio Dipropionate, Grams | 0.5 | 0.5 | 0.5 |
| Solvent, Grams | 616.11 | 644.25 | 700.50 |
| Results |  |  |  |
| Tack Time, Minutes | 8 | 8 | 6 |
| Dead Load Hot Strength, °F. | 220 | 270 | 290 |

Referring to the components used in the adhesive compositions above, Kraton 1101 is a styrene-butadiene block copolymer made and sold by Shell Chemicals wherein the terminal styrene block has a molecular weight of about 5,000 to about 125,000 and the center butadiene block has a molecular weight of about 15,000 to about 250,000 with the styrene block constituting about 30 per cent by weight of the total block. Kraton 1107 is a styrene-isoprene block copolymer made and sold by Shell Chemicals wherein the terminal styrene block has a molecular weight of about 2,000 to about 1000,000 and the center isoprene block has a molecular weight of about 25,000 to about 1,000,000, with the styrene block constituting about 15 per cent by weight of the total block. Cumar LX-509 is a coumarone-indene resin made and sold by Neville Chemicals Company having a melting point of 155° C. and Sta-tac 100 is an isoprene-piperylene copolymer made and sold by Rheichold Chemicals, Inc. having a melting point of 105° C.

The data in the above Tables illustrate the effectiveness of the improved adhesive compositions of the present invention. Note in Table I that the improved composition must contain a styrene-butadiene block copolymer, a styrene-isoprene block copolymer, an isoprene-piperylene copolymer and a solvent. In Runs Nos. II and III where an isoprene-piperylene copolymer or a styrene-isoprene block copolymer, respectively, were not present, a tack time of less than five minutes was obtained. In Run No. I wherein all of the necessary components were present, the tack time was increased appreciably to 100 minutes. The addition of a coumarone-indene resin to the desired composition of Run No. IV reduced both the tack time and the dead load strength obtained in Run No. I, although the tack time and dead load hot strength was still within acceptable limits. That a coumarone-indene resin, when added to the composition herein in selected amounts, will appreciably increase the dead load hot strength of the composition, is apparent from the data in Table II. Thus, in Run No. V when insufficient coumarone-indene resin was used, no improvement in dead load hot strength was obtained and there was a significant reduction in tack time, even though in both instances the values were in the accepted ranges. The addition of increased amounts of coumarone-indene resin in Runs Nos. VI and VII was sufficient to obtain increased dead load hot strength.

Obviously, many modifications and variations of the invention, as hereinabove set forth, can be made without departing from the spirit and scope thereof and, therefore, only such limitations should be imposed as are indicated in the appended claims.

I claim:

1. An adhesive composition consisting essentially of a styrene-butadiene block copolymer, a styrene-isoprene block copolymer, an isoprene-piperylene copolymer and a solvent wherein the components are present in the following ranges, assuming the presence of 100 parts by weight of the styrene-butadiene component in the final composition:

| Component | Weight Per Cent |
|---|---|
| Styrene-Isoprene Block Copolymer | 5–300 |
| Isoprene-Piperylene Copolymer | 5–300 |
| Solvent | 50–4,000 | wherein said styrene-butadiene block copolymer has the following general configuration:

$$A - B - A,$$

wherein A is a styrene polymer block having an average molecular weight of about 5,000 to about 125,000 and B is a butadiene polymer block having an average molecular weight of about 15,000 to about 250,000, with the total of said terminal blocks A amounting to about 20 to about 80 weight per cent of the block copolymer, wherein the styrene-isoprene block copolymer has the following general configuration:

$$A_1 - B_1 - A_1,$$

wherein $A_1$ is a styrene polymer block having an average molecular weight of about 2,000 to about 100,000 and $B_1$ is an isoprene polymer block having an average molecular weight of about 25,000 to about 1,000,000, with the total of said terminal blocks $A_1$ amounting to about eight to about 50 weight per cent of the block copolymer, the melting points of the isoprene-piperylene copolymer being in the range of about 70° to about 130°C., and said solvent being selected from the group consisting of aromatics having from six to eight carbon atoms, aliphatics having from six to eight carbon atoms, ketones having from two to four carbon atoms and esters having from two to four carbon atoms.

2. The composition of claim 1 wherein the components are present in the following ranges, assuming the presence of 100 parts by weight of the styrene-butadiene component in the final composition:

| Component | Weight Per Cent |
|---|---|
| Styrene-Isoprene Block Copolymer | 20–100 |
| Isoprene-Piperylene Copolymer | 20–100 |
| Solvent | 200–800 | wherein said styrene-butadiene block copolymer has the following general configuration:

$$A - B - A,$$

wherein A is a styrene polymer block having an average molecular weight of about 15,000 to about 100,000 and B is a butadiene polymer block having an average molecular weight of about 25,000 to about 150,000, with the total of said terminal blocks A amounting to about 23 to about 50 weight per cent of the block copolymer, wherein the styrene-isoprene block copolymer has the following general configuration:

$$A_1 - B_1 - A_1,$$

wherein $A_1$ is a styrene polymer block having an average molecular weight of about 5,000 to about 50,000 and $B_1$ is an isoprene polymer block having an average molecular weight of about 50,000 to about 500,000, with the total of said terminal blocks $A_1$ amounting to about 10 to about 40 weight per cent of the block copolymer.

3. The composition of claim 1 wherein the solvent is toluene.

4. The composition of claim 1 wherein the solvent is hexane.

5. The composition of claim 1 wherein the solvent is acetone.

6. The composition of claim 1 wherein additionally there is present a coumarone-indene resin in an amount within the range of about 5 to about 200 weight per cent based on the isoprene-piperylene copolymer.

7. The composition of claim 1 wherein additionally there is present a coumarone-indene resin in an amount within the range of about 75 to about 150 weight per cent based on the isoprene-piperylene copolymer.

* * * * *